E. THOMSON & W. H. GREENE.
Manufacture of Sulphuric Acid.

No. 143,202.   Patented September 23, 1873.

Witnesses.
Francis D. Pastorius
Robert K. Lovett

Inventors:
Elihu Thomson
William H. Greene
by Everding & Bell
attys.

UNITED STATES PATENT OFFICE.

ELIHU THOMSON AND WILLIAM H. GREENE, OF PHILADELPHIA, PENNSYLVANIA, ASSIGNORS OF ONE-THIRD THEIR RIGHT TO STEPHEN GREENE, OF SAME PLACE.

IMPROVEMENT IN THE MANUFACTURE OF SULPHURIC ACID.

Specification forming part of Letters Patent No. 143,202, dated September 23, 1873; application filed July 28, 1873.

*To all whom it may concern:*

Be it known that we, ELIHU THOMSON and WILLIAM H. GREENE, both of the city and county of Philadelphia, in the State of Pennsylvania, have invented certain new and useful Improvements in the Manufacture of Sulphuric Acid, of which the following is a specification:

The object of our invention is to provide a process and apparatus for the manufacture of sulphuric acid, by the use of which time, labor, and space will be economized, a purer and stronger acid will be produced, and the whole of the nitrogen compounds employed will be practically utilized, and, further, to provide facilities for producing at one operation concentrated acid of any desired strength or specific gravity; to which ends our improvements consist in combining a burner for evolving sulphurous-acid gas with a producer filled with any porous material which will resist the action of heat and acids, such as coke, pumice, broken earthenware, &c., in which the sulphurous acid is oxidized at a high temperature by the action of nitric acid, and is likewise freed of its impurities, and an absorber or condenser, in which the nitrous gases proceeding from the producer are oxidized by the introduction of air and water, forming nitric acid to be again used in the continuance of the operation, proper conduits and valves being provided to suitably regulate the temperature of the different portions of the apparatus, and also for the admission of air and gases, and an exhauster to maintain a proper circulation, all as hereinafter more fully set forth. In the manufacture of sulphuric acid by means of leaden chambers, which is the process in most general use where such manufacture is carried on upon a large scale, the apparatus required is costly in construction and maintenance, and occupies a large amount of space. The acid produced is contaminated with lead and other impurities, and requires a subsequent concentration in glass or platinum stills, and there is, further, a constant expenditure of nitrogen compounds in the operation as they are allowed to escape into the atmosphere.

Our improvements are designed to obviate the difficulties which are attendant upon the leaden-chamber process, and to furnish such a practicable, economical, and efficient means of producing merchantable sulphuric acid as shall be acceptable to the manufacturing chemist.

Figure 1:
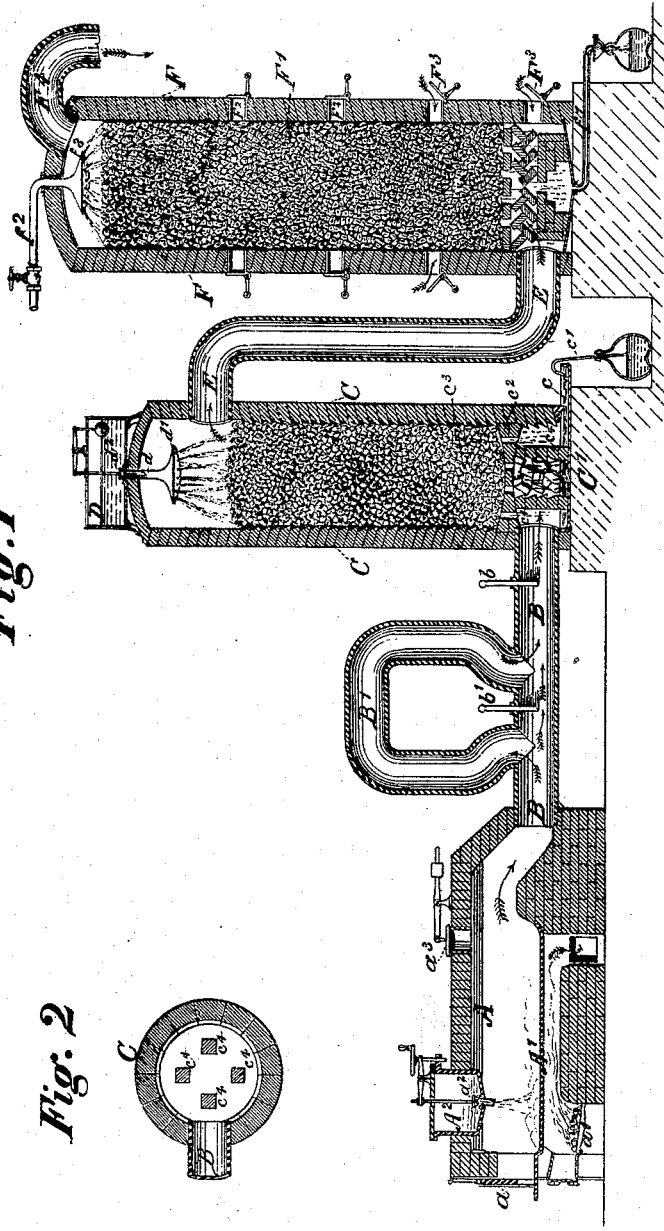
Figure 2:
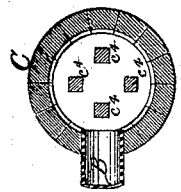
Figure 3:
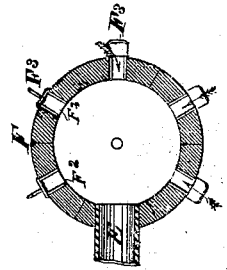
Figure 4:
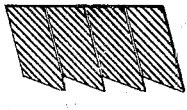

In the accompanying drawings, Figure 1 is a longitudinal section of an apparatus for the manufacture of sulphuric acid embodying our improvements; Fig. 2, a horizontal section of the producer; Fig. 3, a similar section of the absorber; Fig. 4, a section on an enlarged scale of a portion of the walls of the producer, showing the method of construction of the same; and Fig. 5, a vertical section of a portion of the producer and its connections with the burner when used for the manufacture of concentrated acid.

To carry out the object of our invention, we provide a burner for the evolution of sulphurous-acid gas from sulphur, iron pyrites, or other sulphides by their combustion or oxidation, which burner may consist of any suitable receptacle where such combustion can take place, provided with proper means for feeding fresh material and conducting away the sulphurous-acid gas as it is formed. When iron pyrites are used for the production of the gas, the ordinary pyrites-kiln may be employed.

In the drawings, we have shown the burner as a fire-brick chamber, A, the bottom of which is formed of a metallic plate, $A^1$, and provided with an opening for the admission of air and the removal of residues, which is closed by a door, $a$. A small grate, $a^1$, is provided beneath the plate $A^1$ for heating the sulphur in the chamber at the beginning of the operation. The sulphur may either be supplied in the solid state to the chamber through the door $a$, or be fed from a reservoir, $A^2$, in which a charge is kept melted by the heat in the chamber, and may be supplied thereto in a liquid state by a valve, $a^2$, the degree of opening of which can be regulated as required to afford a proper supply of sulphur during the progress of the operation.

Toward the back part of the burner are located air-ports $a^3$, (one or more,) provided with proper doors or registers for the admission of air to insure the complete combustion of the sulphur. A gas channel or conduit, B, conveys the gases evolved from the burner to the producer or hot column C, to which the conduit B is connected near its base. The temperature of the gases is reduced in passing through the conduit B, so that they enter the producer not hotter than 300° to 400° Fahrenheit; and for the purpose of regulating their temperature as perfectly as possible, we provide a supplementary channel, $B^1$, connected at both ends to the conduit B, in which (B) a valve, $b^1$, is placed between the ends of the channel $B^1$. By closing this valve entirely the gases will be compelled to pass through the channel B on their way to the producer, and will be exposed for a correspondingly longer period to the cooling action of the channels, and by suitably regulating the position of the valve $b^1$, one portion of the hot gases can be made to pass through the supplementary channel, while the other portion will pass directly to the producer, thus enabling the operator to regulate their temperature from time to time, as may be required. A valve, $b$, is placed in the conduit B, adjacent to the producer C, to regulate the supply of gases thereto. The producer or hot column C, in which the oxidation of the sulphurous-acid gas is effected, is a chamber of cylindrical, polygonal, or other section, as may be preferred, and built of well-burned fire-brick, quartz rock, stone-ware, or other acid and heat resisting material. It is supported upon a suitable foundation, $C^1$, and is provided with a basin, $c$, at its lower extremity to receive the sulphuric acid as it is formed. The acid is drawn off from the basin $c$ by a siphon, $c^1$, or other suitable appliance. A grating, $c^2$, of fire-brick or similar material, extends across the chamber C, above the mouth of the conduit B, supported on the foundation by small pieces or posts $c^4$ of the same material, above which grating the chamber C is filled nearly to its top with a packing, $c^3$, of porous material, which is capable of resisting the action of heat and acids—as, for example, pumice-stone, coke, porous earthenware, &c. The space below the grating $c^2$, and inside of the supports $c^4$, is also filled with the same packing, but in larger pieces. The packing is put in loosely, in small angular pieces, say about the size of an egg, so as to admit of the distribution and passage of liquid and gaseous matter through it. A conduit, E, opens into the producer near its top, and a pipe, $d$, leading from a reservoir, D, passes through the top of the producer, and terminates in a rose or jet, $d^1$. The reservoir D is filled with nitric acid properly diluted with water, the admission of the same to the pipe $d$ and jet $d^1$ being regulated by a valve, $d^2$. The dilute nitric acid trickles down through the packing $c^3$, so as to be distributed as equally as possible over the area of cross-section of the producer. In order to prevent leakage of acid through the walls of the producer, as well as to prevent the same from running down the sides of the chamber and divert it, as well as the incoming gases, into the mass of packing, we form the walls of pieces of material having a trapezoidal section, and built in, so that their joints shall incline downward and inward, the pieces overlapping on their inner ends, as shown on an enlarged scale in Fig. 4.

By this arrangement it will be obvious that no acid will find its way through the walls of the chamber, which are, furthermore, better calculated to resist the pressure of the packing within than if constructed in the ordinary manner.

The dimensions of the producer will vary according to the amount of acid required to be manufactured in a given time, as well as according to the material used for the packing, the greater the porosity of which the greater will be the productive capacity of a producer of a given size. The height of the producer may be made about four times its mean width at base.

The operation of the producer is as follows: The hot gases from the burner A (which are principally sulphurous acid and nitrogen) pass through the conduit B, or the supplementary channel $B^1$, or both, to the producer C, which they enter below the grating $c^2$, and diffuse themselves through the mass of porous packing therein, meeting with the stream of nitric acid, which drops down through the same, and, owing to the great extent of surface which the moistened porous material exposes to the gases, the reaction of the sulphurous acid upon the nitric acid is greatly facilitated and accelerated. The products of this reaction are sulphuric acid, nitric oxide, and hyponitric acid. The sulphuric acid thus formed trickles down to the lower portion of the chamber, where it is deprived of water and nitrous fumes by the current of hot gases entering from the burner, and finally falls into the basin $c$, whence it is drawn off at proper intervals. The nitric oxide and hyponitric acid generated in the producer pass up through the same, and into the conduit E, by which they are conveyed to the absorber, to be presently described. The temperature of the lower part of the producer is kept at or near the boiling-point of the acid to be made; but in no case must it exceed 600° Fahrenheit. At the top the temperature varies from 120° to 200°.

The walls of the producer should be properly cemented; and a composition of fine sand, coke-dust, bituminous-coal slack, and a little coal-tar, all thoroughly mixed, answers well for the purpose. It is used as a mortar; but the producer so cemented should, before being used, be brought to a temperature of 800° or 900° Fahrenheit, so as to thoroughly carbonize the material of which the cement is composed.

Figure 5:
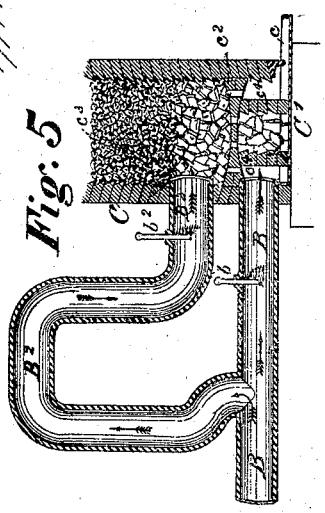

For the manufacture of concentrated sulphuric acid the apparatus is modified, as shown in Fig. 5. In this modification the conduit B is provided with a supplementary conduit, $B^2$, one end of which opens into the conduit B and the other end into the producer C, thus furnishing an additional inlet for the gases from the burner above the inlet of the conduit B, being provided with a valve, $b^2$, to regulate the admission of gas. It is obvious that of the two currents of gas which enter the producer through the conduits B and $B^2$ that which passes through $B^2$ and enters the producer above the other will be of the lower temperature. The current passing through the conduit B, being of a higher temperature, thoroughly removes the nitrous compounds and excess of water from the sulphuric acid which is descending the chamber, and passes up to be mixed with the current entering through the conduit $B^2$, to be acted on in turn, as hereinbefore described. The two currents of gas can be regulated as required by the valves $b$ and $b^2$. The arrangement shown in Fig. 1 may be readily adapted to answer the same purpose by adding a pipe and valve between the supplementary channel and the producer.

The nitric oxide and hyponitric acid generated in the producer pass into the conduit E, by which they are conveyed to a chamber, F, which we term the absorber, in which they meet a stream of cold water, admitted in jets at the top, and passing downward through porous packing $F^1$, similar to that which is placed in the producer, but composed of smaller particles. The gases likewise meet a series of currents of air, and, through the joint agency of the air and moisture, they are oxidized, and nitric acid is formed, which drops to the bottom, and is collected through a pipe, $f^1$, in vessels placed to receive it.

The walls of the absorber are made by preference similarly to those of the producer hereinbefore described, and are provided with a series of air-openings, $F^2$, closed by doors $f^3$, through which openings graduated quantities of air can be admitted to the absorber. A water-pipe, $f^2$, is led into the top of the absorber, and is provided with a jet or sprinkler, $f^3$, which distributes the water to the packing $F^1$, through which it trickles downward to the bottom of the chamber. A pipe, $F^4$, is connected to the top of the absorber, and leads to a suitable exhauster or fan, which maintains a constant circulation of the air and gases through the apparatus. The absorber should have at least twice the cubical contents of the producer, as the volume of the gases proceeding from the latter is nearly doubled by the admission of air. When convenience of working will admit, the absorber may be placed directly over the producer, and, if preferred, it may be divided into two or more absorbing-chambers. The amount of water supplied is regulated according to the amount and concentration of the acid to be made. For example, about one hundred and seventy-five pounds of water are to be fed to the absorber for every three hundred pounds of sulphuric acid of 1.70 specific gravity. Less water will be required for a higher specific gravity, and, conversely, more water for a lower. The walls of the absorber may be cemented with the same composition as hereinbefore mentioned in connection with the producer, or a mixture of pitch, asphaltum, and sand or coke-dust may be melted and applied in a heated state.

The length of the conduit connecting the absorber with the producer is such that the gases shall reach the absorber at a temperature not greatly exceeding that of the atmosphere.

By the use of the absorber, in connection with the burner and producer, it will be seen that there is, practically, no loss of the nitrogen compounds, as the nitrous gases are oxidized and condensed into nitric acid, which can be again used in the reservoir above the producer.

We are aware that condensing chambers or columns have been heretofore known in the manufacture of sulphuric acid, although differently constructed and combined with the other portions of the apparatus from those employed by us. We do not, therefore, broadly claim such device; nor do we claim any of the members of the apparatus hereinbefore described, except when combined and arranged, relatively to each other, substantially as described.

We claim as our invention—

1. An apparatus for the manufacture of sulphuric acid in which the gases evolved from the combustion of sulphur, iron pyrites, or other sulphides are admitted at two points, one above the other, and in two currents of different temperatures, to a chamber filled with a packing of porous material, which is kept constantly moistened with nitric acid, substantially as and for the purpose set forth.

2. An apparatus for the manufacture of sulphuric acid in which the nitrous gases evolved from the reaction of sulphurous acid and nitric acid are subjected to the action of cold water and currents of atmospheric air in the passage of said nitrous gases through a chamber filled with porous packing, substantially as described, whereby the nitrous gases are oxidized and condensed to form nitric acid, which can be again used in the continuance of the operation.

3. In an apparatus for the manufacture of sulphuric acid, the combination of a burner for evolving gases from the combustion of sulphur or sulphides, conduits provided with means for regulating the temperature of said gases and dividing them into two separate currents, a producer filled with porous packing, into which said gases are led, in two separate currents, by the conduits, and a reservoir and valve for supplying a constant stream of nitric acid to the porous packing of the producer, substantially as set forth.

4. In an apparatus for the manufacture of sulphuric acid, the combination of a burner for evolving sulphurous gases, a conduit or conduits for leading said gases to a producer, a producer filled with porous packing moistened with nitric acid, a chamber or series of chambers filled with porous material, and provided with means for supplying jets of water and currents of air to the nitrous gases admitted to them, and an exhauster or fan for maintaining a constant circulation of gases through the apparatus, substantially as set forth.

5. In an apparatus for the manufacture of sulphuric acid, a chamber having its walls composed of blocks of material of trapezoidal section, said blocks overlapping at their inner ends, and being built in, so that their joints shall incline inward and downward, as set forth.

ELIHU THOMSON.
     WM. H. GREENE.

Witnesses:
 FRANCIS D. PASTORIUS,
 ROBERT K. LOVETT.